US012387870B2

(12) United States Patent
Wang et al.

(10) Patent No.: US 12,387,870 B2
(45) Date of Patent: Aug. 12, 2025

(54) COIL DEVICE

(71) Applicant: TDK CORPORATION, Tokyo (JP)

(72) Inventors: Chen Wang, Tokyo (JP); Satoshi Sugimoto, Tokyo (JP)

(73) Assignee: TDK CORPORATION, Tokyo (JP)

( * ) Notice: Subject to any disclaimer, the term of this patent is extended or adjusted under 35 U.S.C. 154(b) by 733 days.

(21) Appl. No.: 17/188,002

(22) Filed: Mar. 1, 2021

(65) Prior Publication Data

US 2021/0272745 A1 Sep. 2, 2021

(30) Foreign Application Priority Data

Mar. 2, 2020 (JP) ................................ 2020-035028

(51) Int. Cl.

*H01F 27/29* (2006.01)
*H01F 27/245* (2006.01)
*H01F 27/30* (2006.01)

(52) U.S. Cl.

CPC .......... *H01F 27/30* (2013.01); *H01F 27/245* (2013.01); *H01F 27/292* (2013.01)

(58) Field of Classification Search

CPC .......... H01F 27/30; H01F 27/245; H01F 3/14; H01F 27/255; H01F 27/2852; H01F 27/306; H01F 27/292; H01F 27/24; H01F 27/2847; H01F 27/38; H01F 38/14

See application file for complete search history.

(56) References Cited

U.S. PATENT DOCUMENTS

2006/0089022 A1* 4/2006 Sano ...................... H01F 17/06 439/79
2006/0158299 A1* 7/2006 Sutardja .................... H01F 3/10 336/174
2008/0303624 A1 12/2008 Yamada et al.
2010/0176909 A1 7/2010 Yasuda et al.
2017/0178784 A1 6/2017 Janis et al.
2018/0068778 A1* 3/2018 Narayanan ................ H01F 3/14
2019/0237245 A1* 8/2019 Ashizawa ............. H01F 27/255

FOREIGN PATENT DOCUMENTS

JP H03-17609 U 2/1991
JP H11-40426 A 2/1999
JP 2000-068129 A 3/2000
JP 2006-100335 A 4/2006
JP 2007-096209 A 4/2007
JP 2008-078177 A 4/2008
JP 2009-016797 A 1/2009
JP 2010-027758 A 2/2010

* cited by examiner

*Primary Examiner* — Tuyen T Nguyen
(74) *Attorney, Agent, or Firm* — Oliff PLC

(57) ABSTRACT

A coil device capable of reducing magnetic coupling between conductors while ensuring good inductance characteristics is provided. A coil device 10 includes a first core 20, a second core 30 combined with the first core 20, and a first conductor 40 and a second conductor 50 arranged adjacent to each other between the first core 20 and the second core 30. At least one of the first core 20 and the second core 30 includes a center leg portion 23 (or a center leg portion 33) and a pair of outer leg portions 22*a*, 22*b* (or outer leg portions 32*a*, 32*b*) arranged on both sides of the center leg portion 23 (or center leg portion 33), and a magnetic body is arranged between the first conductor 40 and the second conductor 50.

20 Claims, 9 Drawing Sheets

COIL DEVICE

BACKGROUND OF THE INVENTION

Field of the Invention

The present invention relates to a coil device used as a coupled inductor or the like.

Description of the Related Art

A coil device called a coupled inductor may be used as a smoothing coil for a switching power supply such as a DC/DC converter. The coupled inductor includes a pair of conductors and the conductors are magnetically coupled with each other by a predetermined coupling coefficient. In recent years, there has been a demand for a coupled inductor having a relatively small coupling coefficient, and examples of a technique for implementing this type of coupled inductor include a technique described in JP-A-2009-16797 (Patent Literature 1).

A coil device described in Patent Literature 1 includes a first core, a second core combined with the first core, and a pair of conductors arranged between the first core and the second core. Each of the first core and the second core includes a center leg portion and a pair of outer leg portions arranged on both sides of the center leg portion. By increasing a gap amount between the first core and the second core at positions of the outer leg portions, it is possible to reduce the coupling coefficient between the conductors.

However, when the gap amount between the first core and the second core is increased as in the coil device described in Patent Literature 1, an inductance value becomes low and good inductance characteristics cannot be obtained.

SUMMARY OF THE INVENTION

The present invention is made in view of such a circumstance and an object of the present invention is to provide a coil device capable of reducing magnetic coupling between conductors while ensuring good inductance characteristics.

In order to achieve the above-mentioned object, the coil device according to the present invention includes:

a first core;

a second core combined with the first core; and a first conductor and a second conductor arranged adjacent to each other between the first core and the second core, in which at least one of the first core and the second core includes a center leg portion and a pair of outer leg portions arranged on both sides of the center leg portion, and a magnetic body is arranged between the first conductor and the second conductor.

In the coil device according to the present invention, the magnetic body is arranged between the first conductor and the second conductor. In this case, coupling between the first conductor and the second conductor is lower than that in a case where no magnetic body is arranged between the first conductor and the second conductor, and it is possible to reduce magnetic coupling between the first conductor and the second conductor. By arranging the magnetic body between the first conductor and the second conductor, the magnetic body contributes to inductance of the coil device, and the inductance value of the whole coil device can be increased. Therefore, according to the coil device according to the present invention, it is possible to reduce the magnetic coupling between the conductors while ensuring good inductance characteristics.

A ratio of a cross-sectional area of the center leg portion to a cross-sectional area of the outer leg portions may be 1:1 to 1:4. In this case, the center leg portion functions as the above-mentioned magnetic body arranged between the first conductor and the second conductor. By such a configuration, it is possible to sufficiently reduce a coupling coefficient between the first conductor and the second conductor, and reduce the magnetic coupling between the conductors while ensuring good inductance characteristics.

A ratio of a width of the center leg portion to a width of the outer leg portions may be 1:1 to 1:4. When the ratio of the cross-sectional area of the center leg portion to the cross-sectional area of the outer leg portions is 1:1 to 1:4, by setting the ratio of the width of the center leg portion to the width of the outer leg portions within the above-mentioned range, it is possible to match protruding widths of the center leg portion and the outer leg portions with each other, and a symmetry between the first core and the second core is good. Therefore, the coil device having good inductance characteristics can be effectively obtained.

The first core may be arranged above the second core and be larger than the second core. By such a configuration, when the first conductor and the second conductor are arranged between the first core and the second core, it is possible to prevent the first conductor and the second conductor from protruding outside the first core, which can contribute to miniaturization of the coil device.

The first core may include a first center leg portion and a first outer leg portion, and the second core may include a second center leg portion and a second outer leg portion. A first recess portion may be formed between the first center leg portion and the first outer leg portion, and a second recess portion may be formed between the second center leg portion and the second outer leg portion. A height of the first center leg portion from a bottom surface of the first recess portion may different from a height of the second center leg portion from a bottom surface of the second recess portion. In this case, when the first core and the second core are combined, a joint portion between the first center leg portion and the second center leg portion is arranged at any height position between the bottom surface of the first recess portion and the bottom surface of the second recess portion, so that the first center leg portion and the second center leg portion can be arranged between the first conductor and the second conductor. Therefore, in this case as well, it is possible to reduce the magnetic coupling between the first conductor and the second conductor while ensuring good inductance characteristics.

A first mounting portion may be provided at both end portions in a longitudinal direction of the first conductor, and a second mounting portion may be provided at both end portions in a longitudinal direction of the second conductor. The first mounting portion may extend toward a side on which one of the pair of outer leg portions is arranged, and the second mounting portion may extend toward a side on which the other one of the pair of outer leg portions is arranged, which is opposite to that of the first mounting portion. By such a configuration, the first mounting portion and the second mounting portion can be separated from each other, and it is possible to prevent a short circuit failure from occurring between the first mounting portion and the second mounting portion. It is possible to ensure a sufficient mounting area for each of the first mounting portion and the second mounting portion, and the coil device can be firmly fixed to a mounting substrate.

At least one of the first core and the second core may contain a metallic magnetic material. By such a configuration, the coupling coefficient between the first conductor and the second conductor can be effectively reduced to a desired value.

The first conductor and the second conductor may be made of conductive plate sheets. By such a configuration, permissible currents flowing through the first conductor and the second conductor can be increased.

DETAILED DESCRIPTION OF THE PREFERRED EMBODIMENTS

Figure 1A:
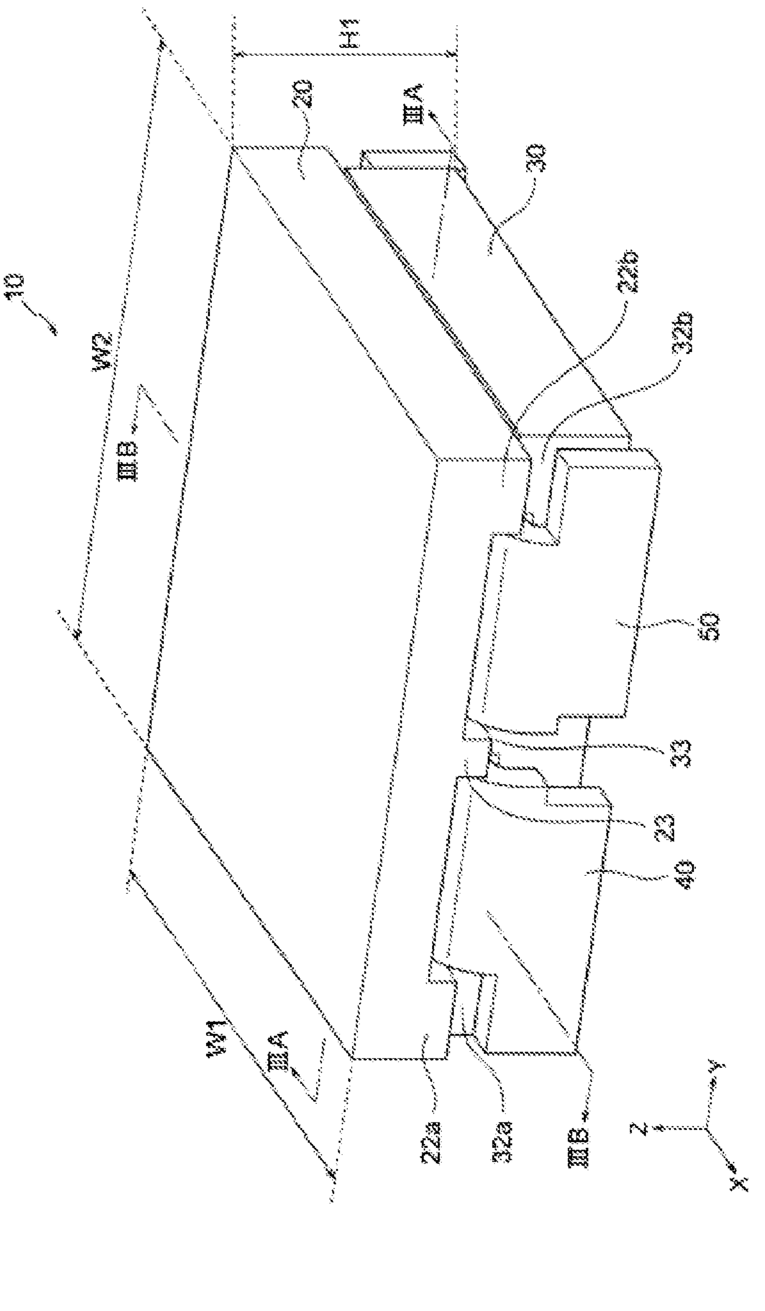
FIG. 1A is a perspective view of a coil device according to a first embodiment of the present invention.

Hereinafter, the present invention will be described based on embodiments shown in the drawings.

First Embodiment

As shown in FIG. 1A, a coil device 10 according to a first embodiment of the present invention includes a first core 20, a second core 30 combined with the first core 20, and a first conductor 40 and a second conductor 50 arranged adjacent to each other between the first core 20 and the second core 30. The coil device 10 is, for example, a coupled inductor and is used as a smoothing coil for a switching power supply such as a DC/DC converter. The above-mentioned switching power supply is used in a power supply circuit in a server, a mobile terminal, or the like.

The coil device 10 has a substantially rectangular parallelepiped shape as a whole. A correlation among a width W1 in an X-axis direction of the coil device 10 (corresponding to a width in the X-axis direction of the first core 20), a width W2 in a Y-axis direction of the coil device 10, and a height H1 of the coil device 10 is W2>W1>H1. That is, an overall shape of the coil device 10 is a substantially flat shape (thin shape). The width W1 in the X-axis direction is preferably 5.0 to 20.0 mm. The width W2 in the Y-axis direction is preferably 5.0 to 20.0 mm. The height H1 is preferably 2.0 to 10.0 mm.

The first core 20 and the second core 30 contain a metallic magnetic material and are obtained by, for example, compression-molding metallic magnetic powder containing metallic magnetic particles. Although the metallic magnetic material is not particularly limited, examples thereof include Fe—Ni alloy powder, Fe—Si alloy powder, Fe—Si—Cr alloy powder, Fe—Co alloy powder, Fe—Si—Al alloy powder, amorphous iron, etc. However, materials constituting the first core 20 and the second core 30 are not limited to these, and the first core 20 and the second core 30 may be made of, for example, ferrite. Examples of ferrite include Ni—Zn-based ferrite, Mn—Zn-based ferrite, etc. Relative permeabilities of the first core 20 and the second core 30 are preferably 40 to 60. A material constituting the first core 20 and a material constituting the second core 30 may be the same with or different from each other.

Figure 2:
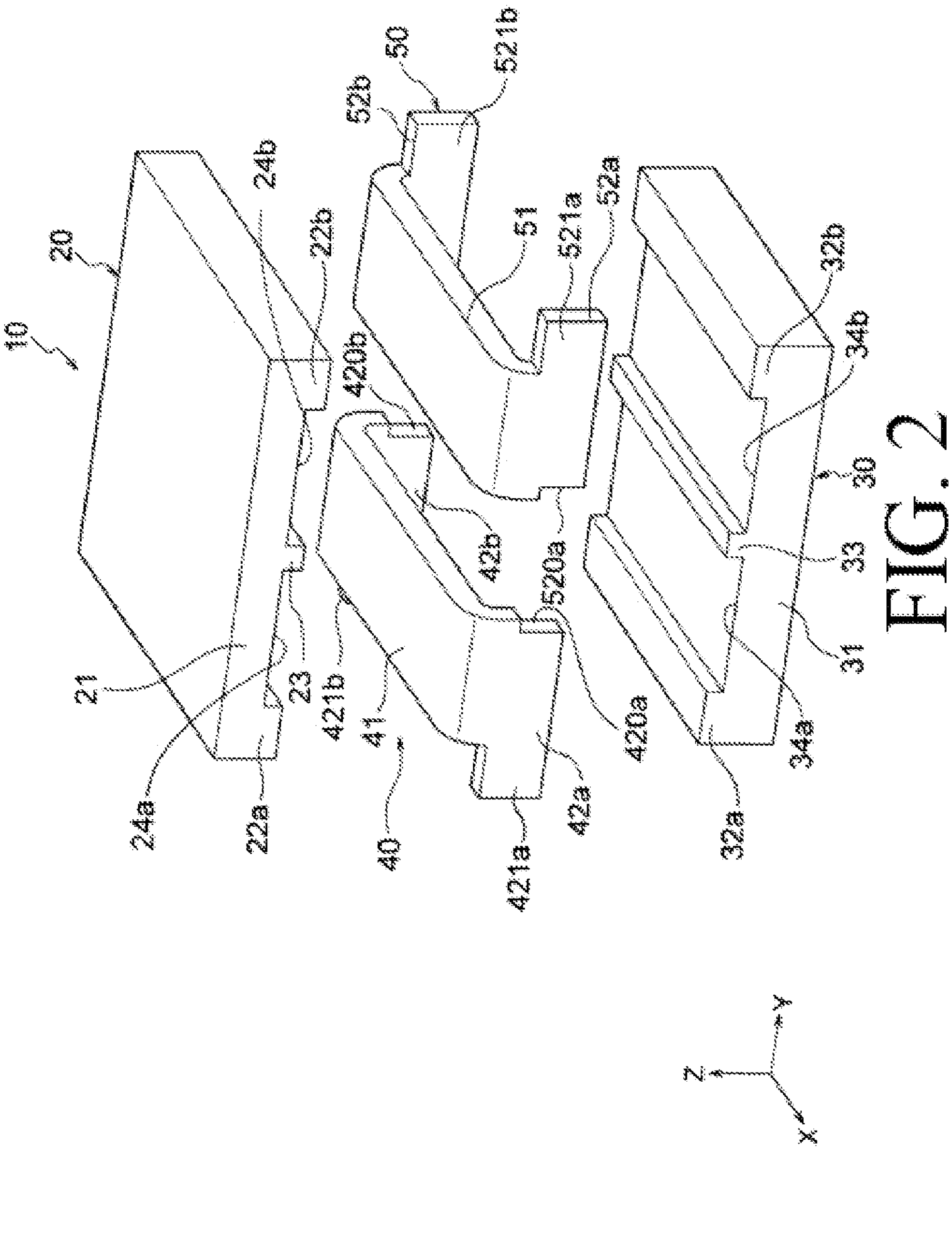
FIG. 2 is an exploded perspective view of the coil device shown in FIG. 1A.

As shown in FIG. 2, the first core 20 and the second core 30 have shapes corresponding to each other, and the second core 30 is arranged below the first core 20 in a Z-axis direction. The first core 20 and the second core 30 both have an E-shaped cross section when viewed in a Y-Z cross section, and constitute a so-called E-shaped core.

The first core 20 includes a first base portion 21, a pair of first outer leg portions 22*a*, 22*b*, a first center leg portion 23, and a pair of first recess portions 24*a*, 24*b*. The first base portion 21 has a substantially flat plate shape and is formed in a longitudinal shape in the Y-axis direction.

Figure 1B:
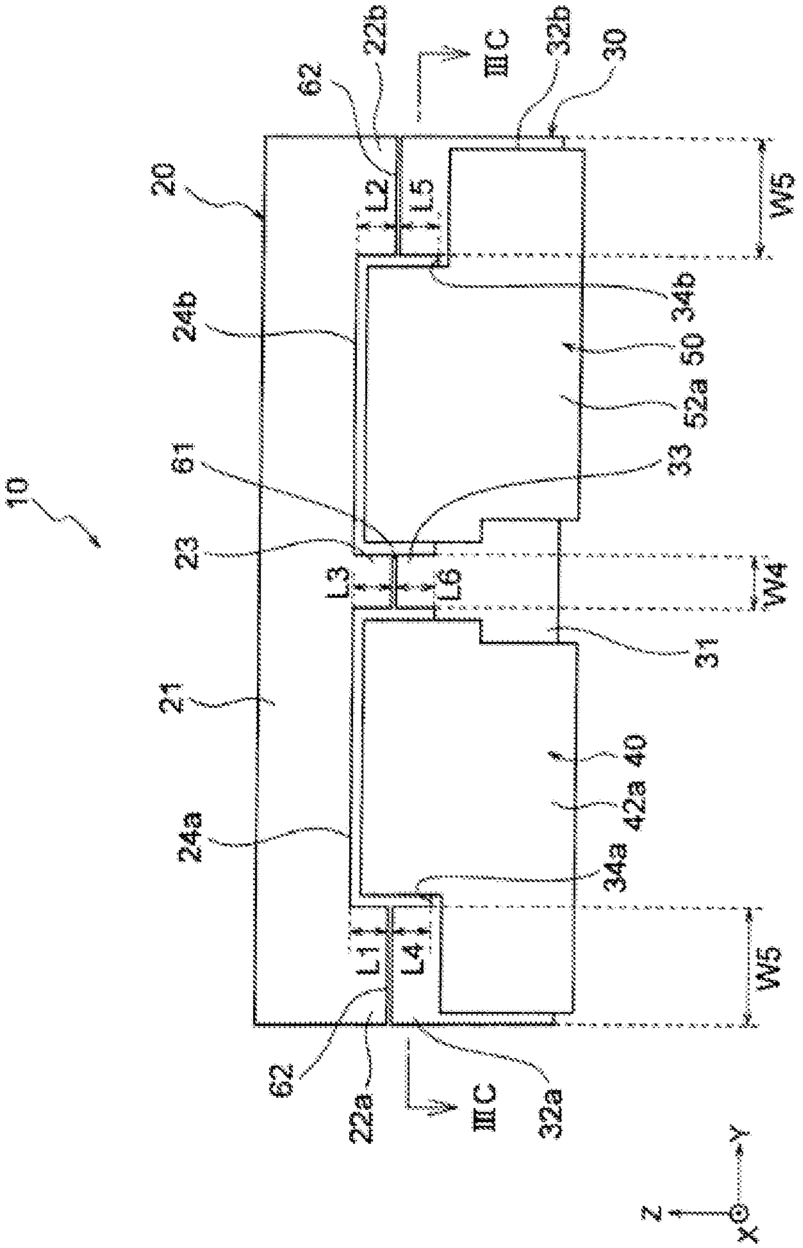
FIG. 1B is a side view of the coil device shown in FIG. 1A when viewed from an X-axis direction.

The pair of first outer leg portions 22*a* and 22*b* are arranged on both sides of the first center leg portion 23. The pair of first outer leg portions 22*a* and 22*b* have the same shape, and protrude downward in the Z-axis direction from both ends in the Y-axis direction of the first base portion 21. As shown in FIG. 1B, a length L1 (a height of the first outer leg portion 22*a* from a bottom surface of the first recess portion 24*a*, which will be described later) in the Z-axis direction of the first outer leg portion 22*a* arranged on one side in the Y-axis direction is equal to a length L2 (a height of the first outer leg portion 22*b* from a bottom surface of the first recess portion 24*b*, which will be described later) in the Z-axis direction of the first outer leg portion 22*b* arranged on the other side in the Y-axis direction.

The first center leg portion 23 protrudes downward in the Z-axis direction from a center in the Y-axis direction of the first base portion 21. A length L3 (a height of the first center leg portion 23 from the bottom surfaces of the recess portions 24*a* and 24*b*, which will be described later) in the Z-axis direction of the first center leg portion 23 is equal to the length L1 and L2 in the Z-axis direction of the first outer leg portions 22*a* and 22*b*.

As shown in FIG. 2, the second core 30 includes a second base portion 31, a pair of second outer leg portions 32*a*, 32*b*, a second center leg portion 33, and a pair of second recess portions 34*a*, 34*b*. The second base portion 31 has a substantially flat plate shape and is formed in a longitudinal shape in the Y-axis direction.

The pair of second outer leg portions 32*a*, 32*b* are arranged on both sides of the second center leg portion 33. The pair of second outer leg portions 32*a*, 32*b* have the same shape, and protrude upwards in the Z-axis direction from both ends in the Y-axis direction of the second base portion 31. As shown in FIG. 1B, a length L4 (a height of the second outer leg portion 32*a* from a bottom surface of the second recess portion 34*a*, which will be described later) in the Z-axis direction of the second outer leg portion 32*a* arranged on one side in the Y-axis direction is equal to a length L5 (a height of the second outer leg portion 32*b* from a bottom surface of the second recess portion 34*b*, which will be described later) in the Z-axis direction of the second outer leg portion 32*b* arranged on the other side in the Y-axis direction.

The second center leg portion 33 protrudes upwards in the Z-axis direction from a center in the Y-axis direction of the second base portion 31. A length L6 (a height of the second center leg portion 33 from the bottom surfaces of the recess portions 34*a* and 34*b*, which will be described later) in the Z-axis direction of the second center leg portion 33 is equal to the length L4 and L5 in the Z-axis direction of the second outer leg portions 32*a*, 32*b*.

Figure 3A:
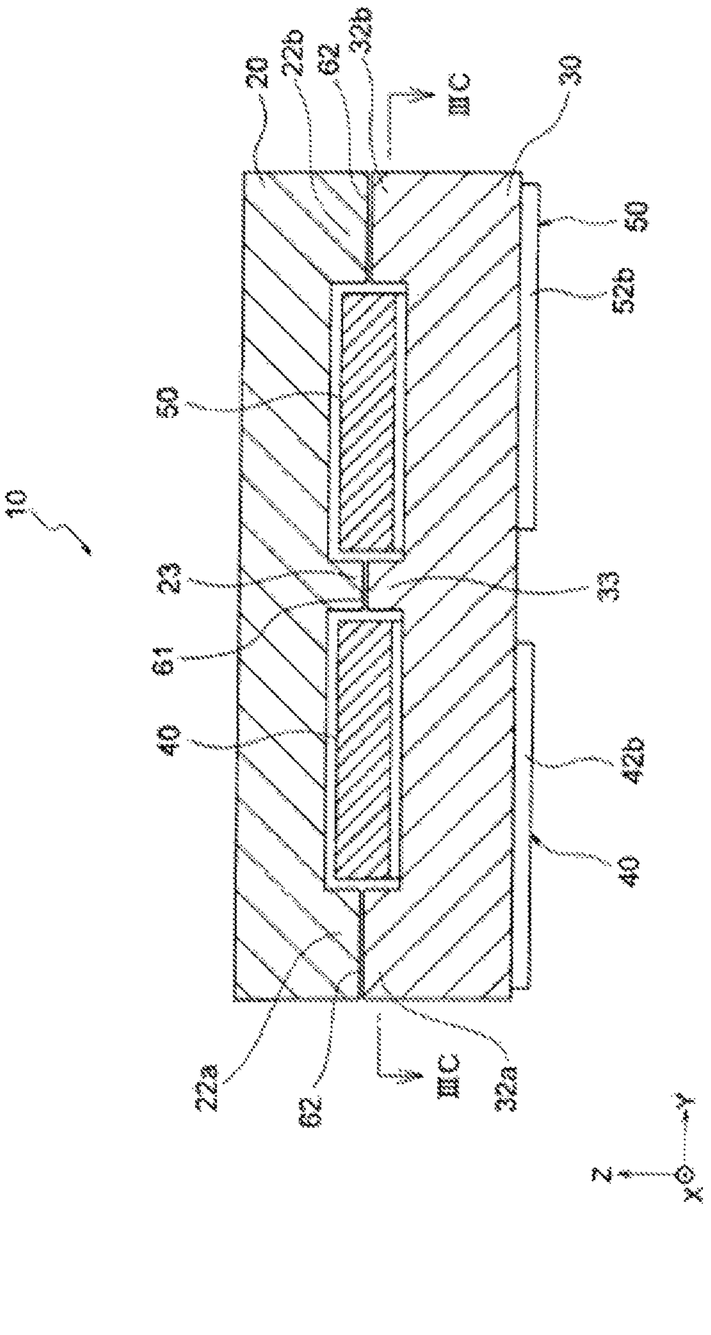
FIG. 3A is a cross-sectional view taken along a line IIIA-IIIA of the coil device shown in FIG. 1A.
Figure 3B:
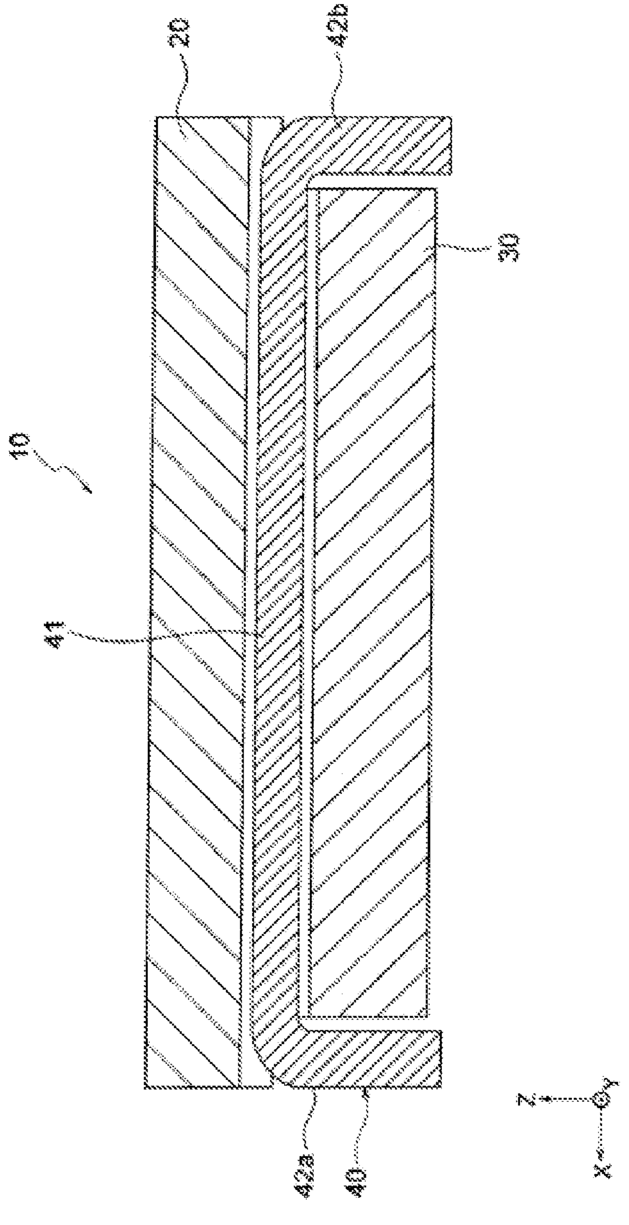
FIG. 3B is a cross-sectional view taken along a line IIIB-IIIB of the coil device shown in FIG. 1A.
Figure 3C:
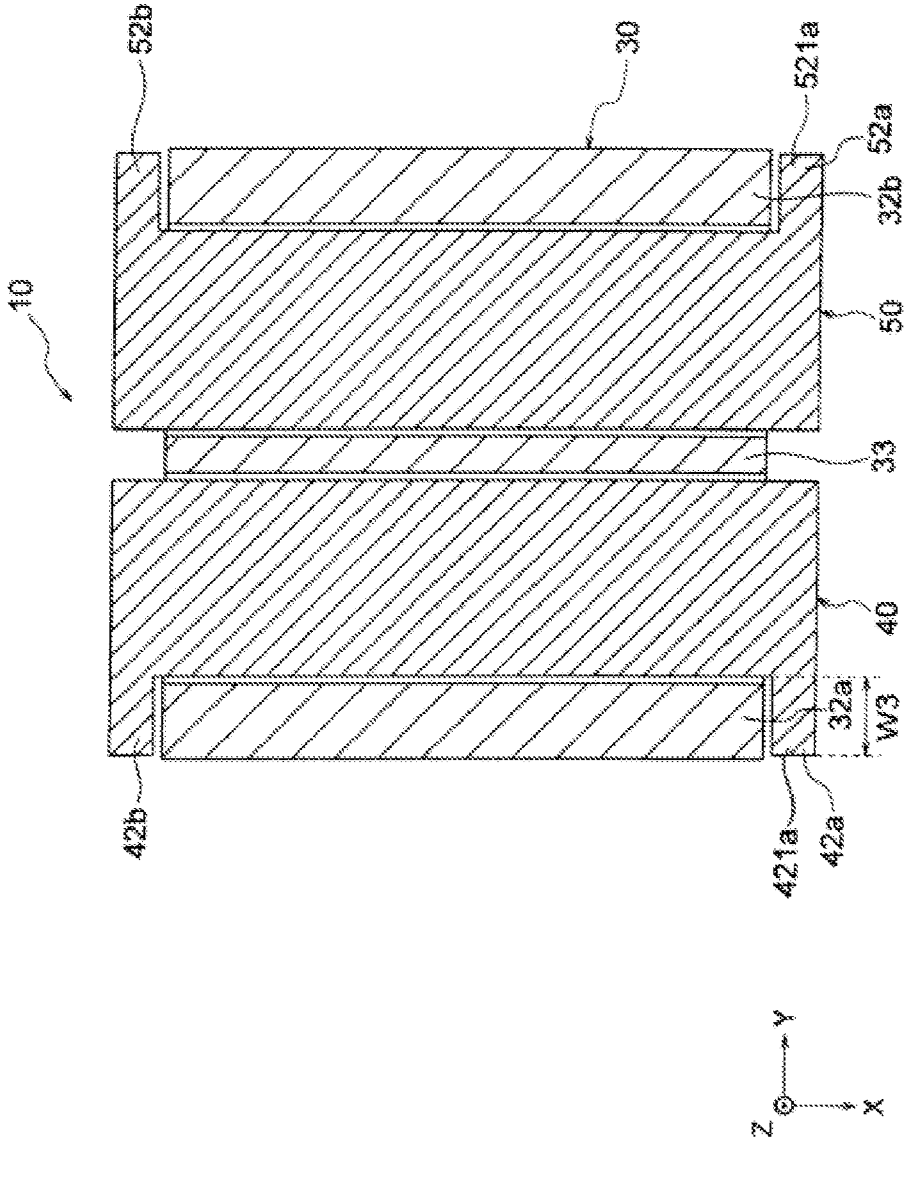
FIG. 3C is a cross-sectional view taken along a line IIIC-IIIC of the coil device shown in FIG. 3A.

As shown in FIG. 3C, the second center leg portion 33 extends continuously along the X-axis direction from one end to the other end of the second core 30 in the X-axis direction and separates the first conductor 40 and the second conductor 50. Similarly, each of the pair of outer leg portions 32*a*, 32*b* also extends continuously along the X-axis direction from the one end to the other end of the second core 30 in the X-axis direction. Although detailed illustration is omitted, the same applies to the first center leg portion 23 and the pair of first outer leg portions 22*a* and 22*b*.

Figure 1C:
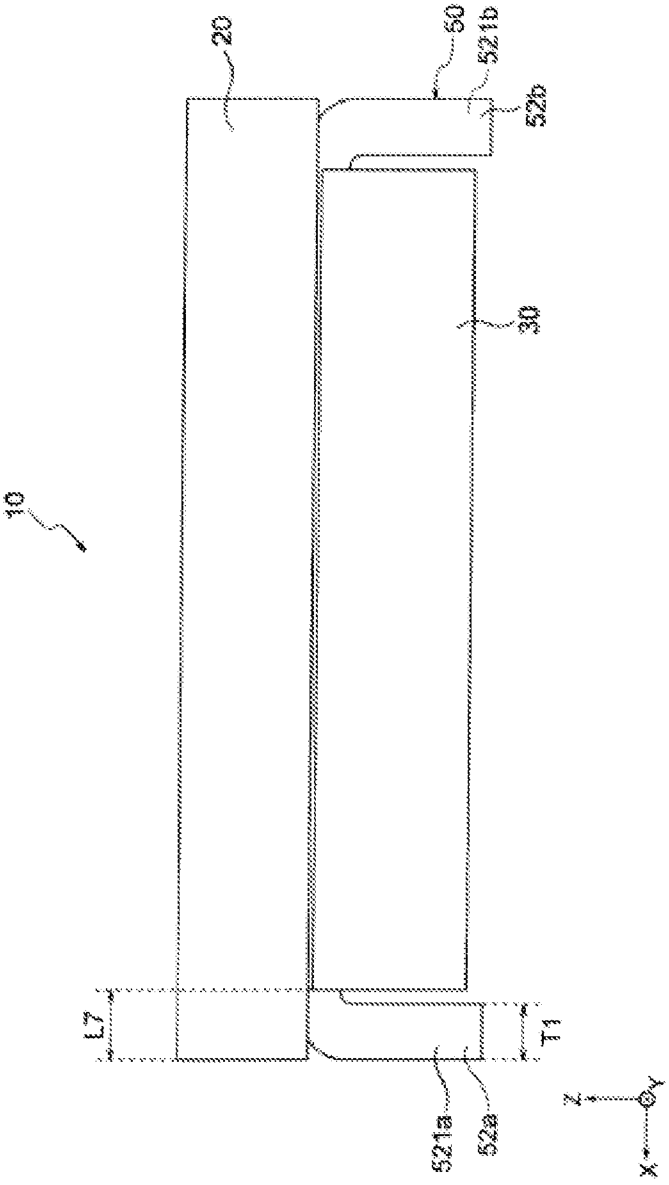
FIG. 1C is a side view of the coil device shown in FIG. 1A when viewed from a Y-axis direction.

As shown in FIGS. 1A and 1C, the first core 20 is arranged above the second core 30 and is larger than the second core 30. More specifically, a length of the first core 20 in the Y-axis direction is substantially equal to a length of the second core 30 in the Y-axis direction, but a length of the first core 20 in the X-axis direction is larger than a length of the second core 30 in the X-axis direction.

In an example shown in FIG. 1C, one end in the X-axis direction of the first core 20 is located outside one end in the X-axis direction of the second core 30 in the X-axis direction, and the other end in the X-axis direction of the first core 20 is located outside the other end in the X-axis direction of the second core 30 in the X-axis direction. Therefore, the first core 20 protrudes outside the second core 30 in the X-axis direction. When the coil device 10 is viewed from above, the second core 30, the first conductor 40 (first mounting portions 42*a*, 42*b* in particular), and the second conductor 50 (second mounting portions 52*a*, 52*b* in particular) are hidden (covered) by the first core 20 and cannot be seen.

The second mounting portion 52*a* of the second conductor 50 (or the first mounting portion 42*a* of the first conductor 40 (not shown)) is arranged below the one end portion in the X-axis direction of the first core 20, and the second mounting portion 52*b* (or the first mounting portion 42*b* of the first conductor 40 (not shown)) of the second conductor 50 is arranged below the other end portion in the X-axis direction of the first core 20.

With reference to one end in the X-axis direction of the second core 30, a protrusion length L7 toward the one end in the X-axis direction of the first core 20 is approximately equal to or greater than a plate thickness T1 of the second conductor 50 ($L7 \geq T1$). The same applies to a protrusion length toward the other end in the X-axis direction of the first core 20 when the other end in the X-axis direction of the second core 30 is used as a reference.

As shown in FIG. 2, the first recess portion 24*a* is formed between the first center leg portion 23 and the first outer leg portion 22*a*, and the first recess portion 24*b* is formed between the first center leg portion 23 and the first outer leg portion 22*b*. The first recess portion 24*a* and the first recess portion 24*b* are adjacent to each other in the Y-axis direction with the first center leg portion 23 interposed therebetween. A depth of the first recess portion 24*a* in the Z-axis direction is substantially equal to a depth of the first recess portion 24*b* in the Z-axis direction.

The second recess portion 34*a* is formed between the second center leg portion 33 and the second outer leg portion 32*a*, and the second recess portion 34*b* is formed between the second center leg portion 33 and the second outer leg portion 32*b*. The second recess portion 34*a* and the second recess portion 34*b* are adjacent to each other in the Y-axis direction with the second center leg portion 33 interposed therebetween. A depth of the second recess portion 34*a* in the Z-axis direction is substantially equal to a depth of the second recess portion 34*b* in the Z-axis direction.

As shown in FIG. 1B, when the first core 20 and the second core 30 are combined in the Z-axis direction, a first gap 61 is formed between the first center leg portion 23 and the second center leg portion 33, and a second gap 62 is formed between each of the first outer leg portions 22*a*, 22*b* and a corresponding one of the second outer leg portions 32*a*, 32*b*. A width in the Z-axis direction of the first gap 61 is substantially equal to a width in the Z-axis direction of the second gap 62.

The widths in the Z-axis direction (gap intervals) of the gaps 61, 62 are sufficiently small with respect to the lengths L1, L4 in the Z-axis direction of the outer leg portions 22*a*, 32*a*, the lengths L2, L5 in the Z-axis direction of the outer leg portions 22*b*, 32*b*, or the lengths L3, L6 in the Z-axis direction of the center leg portions 23, 33, and are preferably 0.0 to 0.3 mm. An inductance value of the coil device 10 can be controlled by adjusting the widths in the Z-axis direction of the gaps 61, 62.

The first core 20 and the second core 30 are combined by joining the first outer leg portions 22*a*, 22*b* of the first core 20 and the second outer leg portions 32*a*, 32*b* of the second core 30 with a joining material such as an adhesive. For example, by using Micropearl (Sekisui Chemical Co., Ltd.) or a resin containing resin beads as the adhesive, the gaps 61, 62 can be easily formed between the first core 20 and the second core 30. The first center leg portion 23 and the second center leg portion 33 may be joined by the above-mentioned adhesive, or only the first outer leg portion 22*a* (or the first outer leg portion 22*b*) and the second outer leg portion 32*a* (or the second outer leg portion 32*b*) may be joined by the above-mentioned adhesive.

A joint portion between the first outer leg portion 22*a* and the second outer leg portion 32*a*, a joint portion between the first outer leg portion 22*b* and the second outer leg portion 32*b*, and a joint portion between the first center leg portion 23 and the second center leg portion 33 are arranged in a region in the Z-axis direction between the bottom surfaces of the recess portions 24*a*, 24*b* and the bottom surfaces of the recess portions 34*a*, 34*b*.

As shown in FIG. 1A, one ends in the X-axis direction of the first outer leg portions 22*a*, 22*b* are located (protruding) outside one ends in the X-axis direction of the second outer leg portions 32*a*, 32*b* in the X-axis direction, and one end in the X-axis direction of the first center leg portion 23 is located (protruded) outside one end in the X-axis direction of the second center leg portion 33 in the X-axis direction. Although detailed illustration is omitted, the other ends in the X-axis direction of the first outer leg portions 22*a*, 22*b* are located (protruding) outside the other ends in the X-axis direction of the second outer leg portions 32*a*, 32*b* in the X-axis direction, and the other end in the X-axis direction of the first center leg portion 23 is located (protruding) outside the other end in the X-axis direction of the second center leg portion 33 in the X-axis direction.

As shown in FIG. 2, the first conductor 40 and the second conductor 50 have the same shape and are arranged adjacent to each other with a predetermined distance in the Y-axis direction. An interval between the first conductor 40 and the second conductor 50 is equal to or greater than widths in the Y-axis direction of the center leg portions 23, 33 (see FIG. 1B).

The first conductor 40 and the second conductor 50 are made of conductive plate sheets (conductor plates) and have a substantially U shape. Widths in the Y-axis direction of the conductors 40, 50 are larger than the width in the Y-axis direction of each of the center leg portions 23, 33 and the outer leg portions 22*a*, 32*a* (or the outer leg portions 22*b*, 32*b*). Examples of materials constituting the conductors 40, 50 include good conductors of metals such as copper and copper alloys, silver, and nickel, but materials of the conductors are not particularly limited. The conductors 40, 50 are formed by, for example, machining a metal plate member. However, a method for forming the conductors 40, 50 is not limited thereto and may be appropriately changed. As shown in FIG. 3B, a length in the X-axis direction of the first conductor 40 (the same applies to the second conductor 50) is larger than the width in the X-axis direction of the second core 30, and is equal to or smaller than the width in the X-axis direction of the first core 20.

As shown in FIG. 2, the first conductor 40 includes a first main body portion 41 and the first mounting portions 42*a*, 42*b*. The first main body portion 41 has a substantially flat plate shape and is formed in a longitudinal shape in the X-axis direction. As shown in FIGS. 3A and 3B, the first main body portion 41 is arranged inside a space defined by the first recess portion 24*a* of the first core 20 and the second recess portion 34*a* of the second core 30. More specifically, the first main body portion 41 extends in the X-axis direction inside the space without contacting the bottom surfaces of the first recess portion 24*a* and the second recess portion 34*a*. A gap is formed between the first main body portion 41 and each of the bottom surfaces of the first recess portion 24*a* and the second recess portion 34*a*.

As shown in FIG. 2, the first mounting portion 42*a* is formed on one end portion in the X-axis direction (a longitudinal direction) of the first main body portion 41, and the first mounting portion 42*b* is formed on the other end portion in the X-axis direction (the longitudinal direction) of the first main body portion 41. The first mounting portions 42*a*, 42*b* intersect the first main body portion 41 substantially perpendicularly and have surfaces parallel to a Y-Z plane.

As shown in FIG. 3C, the first mounting portion 42*a* is arranged along a side surface on one end side in the X-axis direction of the second core 30, and the first mounting portion 42*b* is arranged along a side surface on the other end side in the X-axis direction of the second core 30. A gap is formed between the mounting portions 42*a*, 42*b* and each side surface in the X-axis direction of the second core 30. As shown in FIG. 1B, lower ends of the mounting portions 42*a*, 42*b* are located below one end in the Z-axis direction of the second base portion 31. Lands of a mounting substrate (not shown) are connected to the mounting portions 42*a*, 42*b* by joining members such as solder and conductive adhesive, and the coil device 10 can be connected to the mounting substrate via the mounting portions 42*a*, 42*b* (and the mounting portions 52*a*, 52*b*, which will be described later).

As shown in FIG. 2, the first mounting portion 42*a*, 42*b* respectively include first notch portions 420*a*, 420*b* and first lateral protruding portions 421*a*, 421*b*. The first notch portions 420*a*, 420*b* are formed on one end sides in the Y-axis direction of the first mounting portions 42*a*, 42*b* (a side on which the second conductor 50 is arranged). By the first notch portions 420*a*, 420*b*, a lower end portion located on the one end side in the Y-axis direction of each of the first mounting portion 42*a*, 42*b* is cut out at a predetermined depth toward an upper side in the Z-axis direction and the other end side in the Y-axis direction.

The first lateral protruding portions 421*a*, 421*b* extend in the Y-axis direction toward a side on which the second outer leg portion 32*a* (that is, one of the pair of second outer leg portions 32*a*, 32*b*) is arranged. As shown in FIG. 3C, a protruding width W3 of the first lateral protruding portions 421*a*, 421*b* in the Y-axis direction is substantially equal to a width W5 in the Y-axis direction of the first outer leg portions 22*a*, 22*b* and the second outer leg portions 32*a*, 32*b* shown in FIG. 1B. However, W3 may also be smaller than W5, and the protruding width W3 may be appropriately determined within a range in which the first lateral protruding portions 421*a*, 421*b* do not protrude outside the second outer leg portion 32*a* in the Y-axis direction.

As shown in FIG. 2, the second conductor 50 includes a second main body portion 51 and the second mounting portions 52*a*, 52*b*. Since the second main body portion 51 has the same configuration as the first main body portion 41, detailed description thereof will be omitted. The second main body 51 is arranged inside a space defined by the first recess portion 24*b* of the first core 20 and the second recess portion 34*b* of the second core 30.

The second mounting portions 52*a*, 52*b* are formed respectively on one end and the other end in the X-axis direction of the second conductor 50, and respectively include second notch portions 520*a*, 520*b* and second lateral protruding portions 521*a*, 521*b*. The second notch portions 520*a*, 520*b* are formed on the other end sides in the Y-axis direction of the second mounting portions 52*a*, 52*b* (a side on which the first conductor 40 is arranged). By the second notch portions 520*a*, 520*b*, a lower end portion located on the other end side in the Y-axis direction of each of the second mounting portion 52*a*, 52*b* is cut out at a predetermined depth toward the upper side in the Z-axis direction and the one end side in the Y-axis direction.

At positions where the first notch portions 420*a*, 420*b* and the second notch portions 520*a*, 520*b* are formed, it is possible to increase a distance between the first mounting portion 42*a* and the second mounting portion 52*a*. Therefore, when the coil device 10 is connected to the mounting substrate (not shown), a solder bridge is less likely to occur between the first mounting portion 42*a* and the second mounting portion 52*a*, and an accompanying short-circuit defect can also be prevented.

The second lateral protruding portions 521*a*, 521*b* extend in the Y-axis direction toward a side on which the second outer leg portion 32*b* (that is, the other of the pair of second outer leg portions 32*a*, 32*b*) is arranged, and a protruding direction of the second lateral protruding portions 521*a*, 521*b* is opposite to a protruding direction of the first lateral protruding portions 421*a*, 421*b*. A protruding width of the second lateral protruding portions 521*a*, 521*b* in the Y-axis direction is substantially equal to the protruding width of the first lateral protruding portions 421*a* and 421*b* in the Y-axis direction.

As shown in FIG. 1B, according to the present embodiment, as magnetic body (magnetic materials), the first center leg portion 23 and the second center leg portion 33 are arranged between the first conductor 40 (the first mounting portions 42*a*, 42*b*) and the second conductor 50 (the second mounting portions 52*a*, 52*b*). In coupled inductors in the related art, no magnetic body is arranged between conductors from a viewpoint of enhancing magnetic coupling between conductors, whereas in the coil device 10 according to the present embodiment, between the first conductor 40 and the second conductor 50, a magnetic body for reducing coupling therebetween is arranged (interposed).

As described above, the first center leg portion 23 and the second center leg portion 33 are continuous respectively from one ends to the other ends in the X-axis direction of the first core 20 and the second core 30 (FIG. 3C), and are joined with each other in the Z-axis direction. Therefore, the space in which the first main body portion 41 of the first conductor 40 is accommodated (the space surrounded by the first recess portion 24*a* and the second recess portion 34*a*) and the space in which the second main body portion 51 of the second conductor 50 is accommodated (the space surrounded by the first recess portion 24*b* and the second recess portion 34*b*) are substantially separated by the center leg portions 23 and 33 without communicating with each other (the above spaces only communicate with each other through a slight gap due to the first gap 61).

A ratio of a cross-sectional area of the center leg portions 23, 33 along the Y-Z plane (a sum of cross-sectional areas of the first center leg portion 23 and the second center leg portion 33) to a cross-sectional area of the outer leg portions 22*a*, 32*a* along the Y-Z plane (a sum of cross-sectional areas of the first outer leg portion 22*a* and the second outer leg portion 32*a*) is preferably 1:1 to 1:4. Similarly, a ratio of the cross-sectional area of the center leg portions 23, 33 along the Y-Z plane (the sum of the cross-sectional areas of the first center leg portion 23 and the second center leg portion 33) to a cross-sectional area of the outer leg portions 22*b*, 32*b* along the Y-Z plane (a sum of cross-sectional areas of the first outer leg portion 22*b* and the second outer leg portion 32*b*) is preferably 1:1 to 1:4.

For example, it is possible to make a coupling coefficient between the first conductor 40 and the second conductor 50 to approximately 0.14 to 0.24 by setting the above ratios to approximately 1:1. It is possible to make the coupling coefficient between the first conductor 40 and the second conductor 50 to approximately 0.25 to 0.35 by setting the above ratios to approximately 1:2. It is possible to make the coupling coefficient between the first conductor 40 and the second conductor 50 to approximately 0.45 to 0.55 by setting the above ratios to approximately 1:4.

Therefore, by adjusting the above ratios to any ratio between 1:1 and 1:4 (however, the cross-sectional area of the center leg portions 23, 33 is smaller than the cross-sectional area of the outer leg portions 22*a*, 32*a* or 22*b*, 32*b*), the coupling coefficient between the first conductor 40 and the second conductor 50 can be adjusted to a desired value as described above. By setting the above ratios to approximately 2:1, it is possible to reduce the coupling coefficient between the first conductor 40 and the second conductor 50 to approximately 0.13 to 0.17, and if necessary, the cross-sectional area of the center leg portions 23, 33 may be larger than the cross-sectional area of the outer leg portions 22*a*, 32*a* or 22*b*, 32*b*.

In the present embodiment, the lengths L1, L4 in the Z-axis direction of the outer leg portions 22*a*, 32*a*, the lengths L2, L5 in the Z-axis direction of the outer leg portions 22*b*, 32*b*, and the lengths L3, L6 in the Z-axis direction of the center leg portions 23, 33 are substantially equal to each other. Therefore, by setting a ratio of the width W4 of the center leg portions 23, 33 to the width W5 of the outer leg portions 22*a*, 32*a* (or the outer leg portions 22*b*, 32*b*) to 1:1 to 1:4, the ratio of the cross-sectional area of the center leg portions 23, 33 to the cross-sectional area of the outer leg portions 22*a*, 32*a* (or the outer leg portions 22*b*, 32*b*) can be set to 1:1 to 1:4.

The width W4 of the center leg portions 23, 33 is preferably 0.3 to 2.0 mm. The width W5 of the outer leg portions 22*a*, 32*a* (or the outer leg portions 22*b*, 32*b*) is preferably 0.3 to 8.0 mm.

In the present embodiment, since the magnetic body (center leg portions 23, 33) are arranged between the first conductor 40 and the second conductor 50, magnetic fields generated from the first conductor 40 and the second conductor 50 pass through insides of the magnetic body (center leg portions 23, 33) arranged between the first conductor 40 and the second conductor 50.

In manufacture of the coil device 10, the first core 20 and the second core 30 shown in FIG. 2 are prepared while the first conductor 40 and the second conductor 50 are prepared. Next, the first main body portions 41, 51 of the conductors 40, 50 are arranged inside the second recess portions 34*a*, 34*b* (or the first recess portions 24*a*, 24*b*) of the second core 30 (or the first core 20). Then, by combining the first center leg portion 23 and the second center leg portion 33 and combining the first outer leg portions 22*a*, 22*b* and the second outer leg portions 32*a*, 32*b*, the first core 20 is combined with the second core 30. At this time, the coil device 10 can be obtained by joining the first outer leg portions 22*a*, 22*b* and the second outer leg portions 32*a*, 32*b* with an adhesive or the like.

In the coil device 10 according to the present embodiment, the magnetic body (center leg portions 23, 33) are arranged between the first conductor 40 and the second conductor 50. In this case, the coupling between the first conductor 40 and the second conductor 50 is lower than that in a case where no magnetic body is arranged between the first conductor 40 and the second conductor 50, and it is possible to reduce the magnetic coupling between the first conductor 40 and the second conductor 50. By arranging the magnetic body between the first conductor 40 and the second conductor 50, the magnetic body contribute to inductance of the coil device 10, and the inductance value of the whole coil device 10 can be increased. Therefore, according to the coil device 10 in the present embodiment, it is possible to reduce the magnetic coupling between the first conductor 40 and the second conductor 50 while ensuring good inductance characteristics.

In the present embodiment, the ratio of the cross-sectional area of the center leg portions 23, 33 to the cross-sectional area of the outer leg portions 22*a*, 32*a* (or the outer leg portions 22*b*, 32*b*) is 1:1 to 1:4. In this case, the center leg portions 23, 33 function as the above-mentioned magnetic body arranged between the first conductor 40 and the second conductor 50. By such a configuration, it is possible to sufficiently reduce the coupling coefficient between the first conductor 40 and the second conductor 50, and reduce the magnetic coupling between the first conductor 40 and the second conductor 50 while ensuring good inductance characteristics.

In the present embodiment, the ratio of the width of the center leg portions 23, 33 to the width of the outer leg portions 22*a*, 32*a* (or the outer leg portions 22*b*, 32*b*) is 1:1 to 1:4. When the ratio of the cross-sectional area of the center leg portions 23, 33 to the cross-sectional area of the outer leg portions 22*a*, 32*a* (or the outer leg portions 22*b*, 32*b*) is 1:1 to 1:4, by setting the ratio of the width of the center leg portions 23, 33 to the width of the outer leg portions 22*a*, 32*a* (or the outer leg portions 22*b*, 32*b*) within the above-mentioned range, it is possible to match the protruding widths of the center leg portions 23, 33 and the outer leg portions 22*a*, 32*a* (or the outer leg portions 22*b*, 32*b*) with each other, and a symmetry between the first core 20 and the second core 30 is good. Therefore, the coil device 10 having good inductance characteristics can be effectively obtained.

In the present embodiment, the first core 20 is arranged above the second core 30 and is larger than the second core 30. Therefore, when the first conductor 40 and the second conductor 50 are arranged between the first core 20 and the second core 30, it is possible to prevent the first conductor 40 and the second conductor 50 from protruding outside the first core 20, which can contribute to miniaturization of the coil device 10.

In the present embodiment, the first mounting portions 42*a*, 42*b* are provided at end portions in a longitudinal direction of the first conductor 40, and the second mounting portions 52*a*, 52*b* are provided at end portions in a longitudinal direction of the second conductor 50. The first mounting portions 42*a*, 42*b* extend toward a side on which the outer leg portions 22*a*, 32*a* are arranged, and the second mounting portions 52*a*, 52*b* extend toward a side on which the outer leg portions 22*b*, 32*b* are arranged, which is opposite to that of the first mounting portions 42*a*, 42*b*. Therefore, the first mounting portions 42*a*, 42*b* and the second mounting portions 52*a*, 52*b* can be separated from each other, and it is possible to prevent a short circuit failure from occurring between the first mounting portions 42*a*, 42*b* and the second mounting portions 52*a*, 52*b*. It is further possible to ensure a sufficient mounting area for each of the first mounting portions 42*a*, 42*b* and the second mounting portions 52*a*, 52*b*, and the coil device 10 can be firmly fixed to the mounting substrate (not shown).

In the present embodiment, at least one of the first core 20 and the second core 30 contains the metallic magnetic material. Therefore, the coupling coefficient between the first conductor 40 and the second conductor 50 can be effectively reduced to a desired value (for example, preferably approximately 0.1 to 0.5, more preferably approximately 0.3 to 0.5).

In the present embodiment, the first conductor 40 and the second conductor 50 are made of the conductive plate sheets. Therefore, permissible currents flowing through the first conductor 40 and the second conductor 50 can be increased.

Second Embodiment

Figure 4:
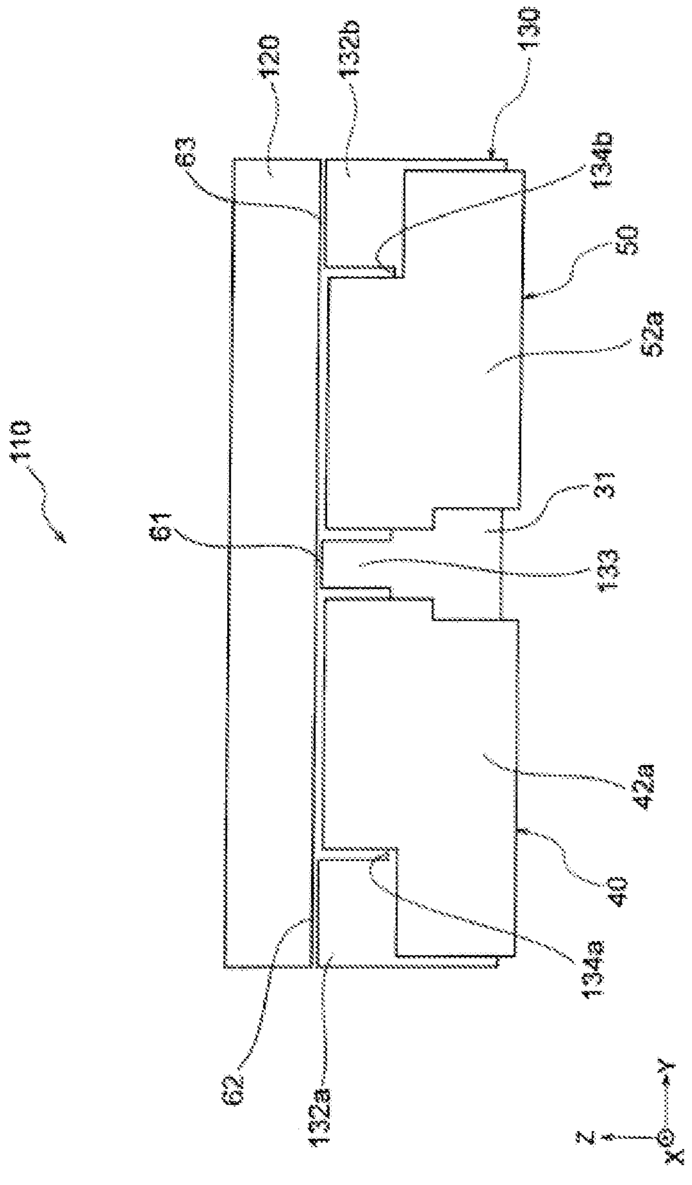
FIG. 4 is a side view of a coil device according to a second embodiment of the present invention when viewed from an X-axis direction.

A coil device 110 according to a second embodiment shown in FIG. 4 has the same configuration as that of the coil device 10 according to the first embodiment except for the following points, and exhibits the same effects. In FIG. 4, members common to members in the coil device 10 according to the first embodiment are denoted by common reference numerals, and a part of description thereof will be omitted.

As shown in FIG. 4, the coil device 110 includes a first core 120 and a second core 130. The first core 120 has a substantially flat plate shape (substantially rectangular parallelepiped shape) and constitutes a so-called I-shaped core.

The second core 130 includes second outer leg portions 132*a*, 132*b*, a second center leg portion 133, and second recess portions 134*a*, 134*b*. A length in the Z-axis direction of the second outer leg portions 132*a*, 132*b* is larger than the length in the Z-axis direction of the second outer leg portions 32*a*, 32*b* according to the first embodiment. A length of the center leg portion 133 is larger than the length in the Z-axis direction of the center leg portion 33 according to the first embodiment. A depth in the Z-axis direction of the second recess portions 134*a*, 134*b* is larger than the depth in the Z-axis direction of the second recess portions 34*a*, 34*b* according to the first embodiment.

In the present embodiment, at least one of the first core 120 and the second core 130 (only the second core 130 according to an example shown in the drawing) has an E-shaped core having the second center leg portion 133 and a pair of the second outer leg portions 132*a*, 132*b*. The first core 120 may be configured to an E-shaped core, and the second core 130 may be configured to an I-shaped core.

By such a configuration, it is possible to combine the I-shaped first core 120 and the E-shaped second core 130 with the gaps 61, 62 therebetween, and the coil device 110 can have an EI shape. In the present embodiment, a magnetic body arranged between the first conductor 40 and the second conductor 50 is only the second center leg portion 133.

In the present embodiment, the magnetic body (second center leg portion 133) is arranged between the first conductor 40 and the second conductor 50. Therefore, the same effects as those of the first embodiment can be obtained.

Third Embodiment

Figure 5:
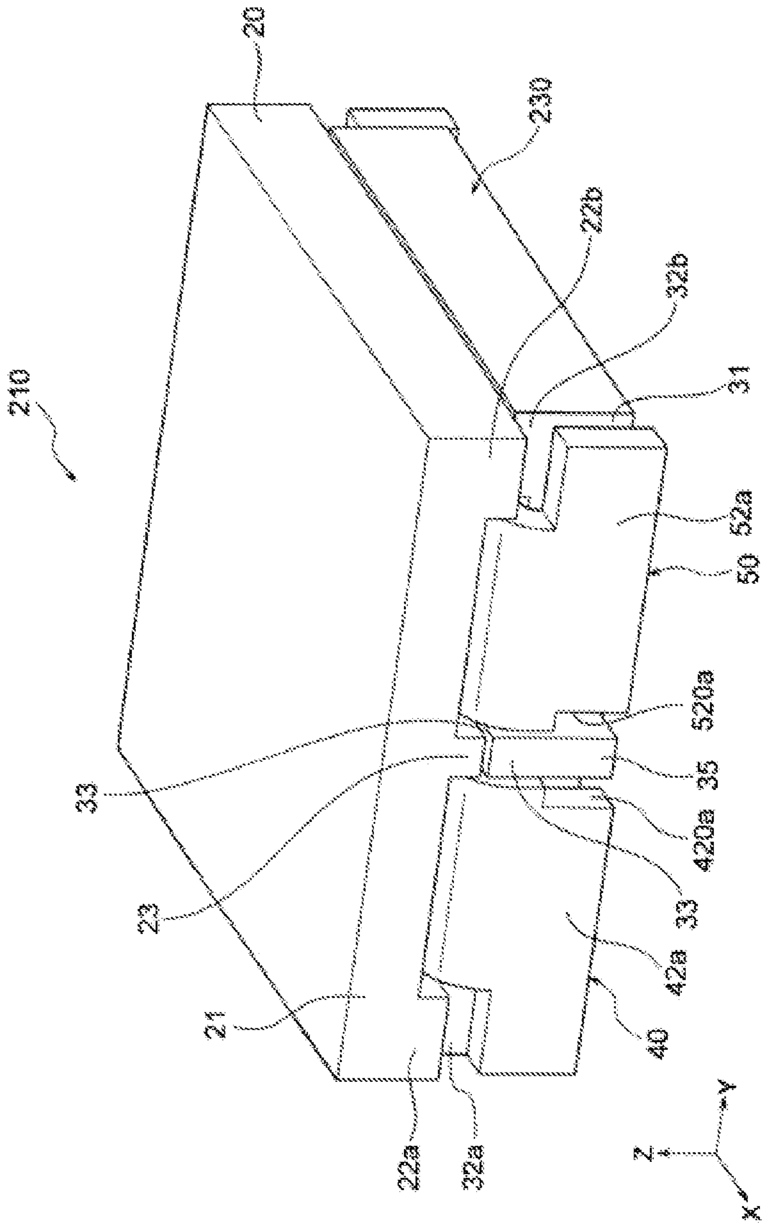
FIG. 5 is a perspective view of a coil device according to a third embodiment of the present invention.

A coil device 210 according to a third embodiment shown in FIG. 5 has the same configuration as that of the coil device 10 according to the first embodiment except for the following points, and exhibits the same effects. In FIG. 5, members common to members in the coil device 10 according to the first embodiment are denoted by common reference numerals, and a part of description thereof will be omitted.

As shown in FIG. 5, the coil device 210 includes a second core 230. The second core 230 differs from the second core 30 according to the first embodiment in that the second core 230 includes a protruding portion 35. The protruding portion 35 protrudes in an X-axis direction from a side surface on one end side in the X-axis direction of the second core 230 toward outside of the second core 230. Although not shown, a protruding portion protruding in the X-axis direction toward the outside of the second core 230 is also formed on a side surface on the other end side in the X-axis direction of the second core 230.

The protruding portion 35 straddles the second base portion 31 and the second center leg portion 33 in a Z-axis direction. That is, by the protruding portion 35, substantially central portions in a Y-axis direction of the second center leg portion 33 and the second base portion 31 protrude in the X-axis direction toward the outside of the second core 230.

A width of the protruding portion 35 in the Y-axis direction is substantially the same as the width of the first center leg portion 23 and the second center leg portion 33 in the Y-axis direction. A length of the protruding portion 35 in the Z-axis direction is substantially equal to a sum of the lengths of the second base portion 31 and the second center leg portion 33 in the Z-axis direction. A protruding width of the protruding portion 35 in the X-axis direction is substantially equal to the length L7 shown in FIG. 1C. At a position where the protruding portion 35 is formed, a side surface on one end side in the X-axis direction of the first core 20 and a side surface on one end side in the X-axis direction of the second core 230 are substantially flush with each other.

In the present embodiment, the first mounting portion 42*a* is arranged on one side in the Y-axis direction with the protruding portion 35 in between, and the second mounting portion 52*a* is arranged on the other side in the Y-axis direction with the protruding portion 35 in between. In this way, by arranging (interposing) the protruding portion 35 between the first mounting portion 42*a* and the second mounting portion 52*a*, it is possible to effectively prevent a short circuit failure from occurring between the first mounting portion 42*a* and the second mounting portion 52*a*.

The present invention is not limited to the above-mentioned embodiments and various modifications can be made within a scope of the present invention.

In each of the above-mentioned embodiments, an application example of the coil device 10 according to the present invention to a coupled inductor is described, but the present invention may also be applied to other inductors or other coil devices.

In the first embodiment, the first core 20 and the second core 30 may be integrally formed (one core). In this case, the first gap 61 shown in FIG. 1B may be omitted, and the second gap 62 may be further omitted. The same applies to the second embodiment and the third embodiment.

In the first embodiment, the magnetic body arranged between the first conductor 40 and the second conductor 50 is a part (center leg portions 23, 33) of the cores 20, 30, but the magnetic body may be formed separately from the cores 20, 30. The same applies to the second embodiment and the third embodiment. For example, in the first embodiment, each of the cores 20, 30 may be made of a flat plate-shaped core, and the first conductor 40 and the second conductor 50, which are arranged adjacent to each other, may be sandwiched between the cores 20, 30 with a separately prepared magnetic body arranged between the first conductor 40 and the second conductor 50. The magnetic body used in this case may be, for example, a magnetic body corresponding to a shape of the center leg portion 133 (see FIG. 4) according to the second embodiment. In this case, the magnetic body may be made of a material different from those of the first core 20 and the second core 30.

In the first embodiment, a height of the first center leg portion 23 from the bottom surfaces of the first recess portions 24*a*, 24*b* may be different from a height of the second center leg portion 33 from the bottom surfaces of the second recess portions 34*a*, 34*b*. In this case, as shown in FIG. 1B, when the first core 20 and the second core 30 are combined, the joint portion between the first center leg portion 23 and the second center leg portion 33 is arranged at any height position between the bottom surfaces of the first recess portions 24*a*, 24*b* and the bottom surfaces of the second recess portions 34*a*, 34*b*, so that the first center leg portion 23 and the second center leg portion 33 can be arranged between the first conductor 40 and the second conductor 50. Therefore, in this case as well, it is possible to reduce the magnetic coupling between the first conductor 40 and the second conductor 50 while ensuring good inductance characteristics. The same applies to the third embodiment.

When the first core 20 and the second core 30 are combined, by the magnetic body arranged between the first conductor 40 and the second conductor 50, it is preferable that 50% or more of an area in the Z-axis direction between the bottom surfaces of the first recess portions 24*a*, 24*b* and the bottom surfaces of the second recess portions 34*a*, 34*b* is occupied, and it is more preferable that 60% or more of the same area is occupied.

In the first embodiment, although the lengths of the first core 20 and the second core 30 in the Z-axis direction are substantially equal to each other, the lengths may be different. The length L1 and the length L4 shown in FIG. 1B may be different. The length L3 and the length L6 may be different. The length L2 and the length L5 may be different. The same applies to the second embodiment and the third embodiment.

In the first embodiment, as shown in FIG. 1A, the overall shape of the coil device 10 when the first core 20 and the second core 30 are combined is a substantially flat (thin) rectangular parallelepiped shape. However, for example, the length of the second core 30 in the Z-axis direction may be larger than the length of the first core 20 in the Z-axis direction, and the overall shape may be a cube shape. In this case, it is possible to increase the coupling coefficient between the first conductor 40 and the second conductor 50.

In this case, by adjusting the ratio of the cross-sectional area of the center leg portions 23, 33 (the sum of the cross-sectional areas of the first center leg portion 23 and the second center leg portion 33) to the cross-sectional area of the outer leg portions 22*a*, 32*a* (the sum of the cross-sectional areas of the first outer leg portion 22*a* and the second outer leg portion 32*a*) to any value within the range of 1:1 to 1:4, the coupling coefficient between the first conductor 40 and the second conductor 50 can be adjusted between approximately 0.2 to 0.5. In this case, the materials constituting the first core 20 and the second core 30 may be changed as necessary.

As shown in FIG. 1A, when the coil device 10 has a thin shape, a sum of the length L3 of the first center leg portion 23 in the Z-axis direction and the length L6 of the second center leg portion 33 in the Z-axis direction shown in FIG. 1B is preferably 0.55 to 0.75 mm. A length of the first base portion 21 or the second base portion 31 in the Z-axis direction is preferably 0.25 to 0.4 mm.

In each of the above-mentioned embodiments, the first notch portions 420*a*, 420*b* and the second notch portions 520*a*, 520*b* may be omitted from the first mounting portions 42*a*, 42*b* and the second mounting portions 52*a*, 52*b*, respectively.

In each of the above-mentioned embodiments, the first conductor 40 and the second conductor 50 may be made of conductors (for example, wires) other than the conductive plate sheets.

REFERENCE SIGNS LIST

10, 110, 210 coil device
20, 120 first core
21 first base portion
22*a*, 22*b* first outer leg portion
23 first center leg portion
24*a*, 24*b* first recess portion
30, 130, 230 second core
31 second base portion
32*a*, 32*b*, 132*a*, 132*b* second outer leg portion
33, 133 second center leg portion
34*a*, 34*b*, 134*a*, 134*b* second recess portion
35 protruding portion
40 first conductor
41 first main body portion
42*a*, 42*b* first mounting portion
420*a*, 420*b* first notch portion
421*a*, 421*b* first lateral protruding portion
50 second conductor
51 second main body portion
52*a*, 52*b* second mounting portion
520*a*, 520*b* second notch portion
521*a*, 521*b* second lateral protruding portion
61 first gap
62 second gap

What is claimed is:

1. A coil device, comprising:

a first core;

a second core combined with the first core and having a main surface configured to face a mounting substrate and a side surface perpendicular to the main surface;

a first conductor and a second conductor arranged adjacent to each other between the first core and the second core; and a magnetic body provided integrally or separately with the first core or the second core, wherein at least one of the first core and the second core includes (i) a center leg portion located between the first conductor and the second conductor and constituting the magnetic body and (ii) a pair of outer leg portions arranged on both sides of the center leg portion, the first conductor has (i) a first main body portion arranged between the first core and the second core and (ii) a first mounting portion continuous to the first main body portion and arranged over the side surface, the second conductor has (i) a second main body portion arranged between the first core and the second core and (ii) a second mounting portion continuous to the second main body portion and arranged over the side surface, the first mounting portion has a first lateral protruding portion protruding on one side in a first direction (Y-axis direction) from the first main body portion and the second mounting portion has a second lateral protruding portion protruding on the other side in the first direction (Y-axis direction) from the second main body portion, and the first mounting portion and the second mounting portion extend parallel to the side surface as a whole and lower ends of the first lateral protruding portion and the second lateral protruding portion protrude downward from the main surface in a direction from the first core to the second core along the side surface without bending.

2. The coil device according to claim 1, wherein an end portion in a second direction (X-axis) perpendicular to the first core in the first direction protrudes outward from an end portion of the center leg portion of the second core in the second direction.

3. The coil device according to claim 1, wherein a ratio of a cross-sectional area of the center leg portion to a cross-sectional area of the outer leg portions is 1:1 to 1:4.

4. The coil device according to claim 3, wherein a ratio of a width of the center leg portion to a width of the outer leg portions is 1:1 to 1:4.

5. The coil device according to claim 1, wherein the first core is arranged above the second core and is larger than the second core.

6. The coil device according to claim 3, wherein the first core is arranged above the second core and is larger than the second core.

7. The coil device according to claim 4, wherein the first core is arranged above the second core and is larger than the second core.

8. The coil device according to claim 1, wherein the first core includes a first center leg portion and first outer leg portions;

the second core includes a second center leg portion and second outer leg portions;

a first recess portion is formed between the first center leg portion and each of the first outer leg portions;

a second recess portion is formed between the second center leg portion and each of the second outer leg portions; and a height of the first center leg portion from a bottom surface of the first recess portion is different from a height of the second center leg portion from a bottom surface of the second recess portion.

9. The coil device according to claim 3, wherein the first core includes a first center leg portion and a first outer leg portion;

the second core includes a second center leg portion and a second outer leg portion;

a first recess portion is formed between the first center leg portion and the first outer leg portion;

a second recess portion is formed between the second center leg portion and the second outer leg portion; and a height of the first center leg portion from a bottom surface of the first recess portion is different from a height of the second center leg portion from a bottom surface of the second recess portion.

10. The coil device according to claim 4, wherein the first core includes a first center leg portion and a first outer leg portion;

the second core includes a second center leg portion and a second outer leg portion;

a first recess portion is formed between the first center leg portion and the first outer leg portion;

a second recess portion is formed between the second center leg portion and the second outer leg portion; and a height of the first center leg portion from a bottom surface of the first recess portion is different from a height of the second center leg portion from a bottom surface of the second recess portion.

11. The coil device according to claim 1, wherein the first mounting portion includes two parts provided at respective end portions in the second direction of the first conductor; and the second mounting portion includes two parts provided at respective end portions in the second direction of the second conductor.

12. The coil device according to claim 3, wherein the first mounting portion includes two parts provided at respective end portions in the second direction of the first conductor; and the second mounting portion includes two parts provided at respective end portions in the second direction of the second conductor.

13. The coil device according to claim 4, wherein the first mounting portion includes two parts provided at respective end portions in the second direction of the first conductor; and the second mounting portion includes two parts provided at respective end portions in the second direction of the second conductor.

14. The coil device according to claim 1, wherein at least one of the first core and the second core contains a metallic magnetic material.

15. The coil device according to claim 3, wherein at least one of the first core and the second core contains a metallic magnetic material.

16. The coil device according to claim 4, wherein at least one of the first core and the second core contains a metallic magnetic material.

17. The coil device according to claim 1, wherein the first conductor and the second conductor are made of conductive plate sheets.

18. The coil device according to claim 3, wherein the first conductor and the second conductor are made of conductive plate sheets.

19. The coil device according to claim 4, wherein the first conductor and the second conductor are made of conductive plate sheets.

20. A coil device, comprising:

a first core;

a second core combined with the first core and having a main surface configured to face a mounting substrate and a side surface perpendicular to the main surface; and a first conductor and a second conductor arranged adjacent to each other in a first direction between the first core and the second core, the side surface being at an end of the second core in a second direction perpendicular to the first direction, the second core being arranged below the first core in a third direction, the main surface being at a bottom of the second core facing away from the first core in the third direction, the third direction being perpendicular to the first direction and the second direction, wherein at least one of the first core and the second core includes (i) a center leg portion located between the first conductor and the second conductor in the first direction and constituting a magnetic body and (ii) a pair of outer leg portions arranged on both sides of the center leg portion in the first direction, the first conductor has (i) a first main body portion arranged between the first core and the second core in the third direction and (ii) a first mounting portion continuous to the first main body portion and arranged over the side surface, the first mounting portion being at an end of the first main body portion in the second direction, the second conductor has (i) a second main body portion arranged between the first core and the second core in the third direction and (ii) a second mounting portion continuous to the second main body portion and arranged over the side surface, the second mounting portion being at an end of the second main body portion in the second direction, the first mounting portion and the second mounting portion being arranged adjacent to each other in the first direction over the side surface, the first mounting portion and the second mounting portion extending from between the first core and the second core toward the main surface in the third direction, and the first mounting portion has a first lateral protruding portion protruding on one side of the first direction from the first main body portion and the second mounting portion has a second lateral protruding portion protruding on the other side of the first direction from the second main body portion, and the first mounting portion and the second mounting portion extend parallel to the side surface as a whole and lower ends of the first lateral protruding portion and the second lateral protruding portion in the third direction protrude downward from the main surface in the third direction along the side surface without bending.

* * * * *